United States Patent [19]
Kishi

[11] Patent Number: 6,105,037
[45] Date of Patent: Aug. 15, 2000

[54] APPARATUS FOR PERFORMING AUTOMATED RECONCILE CONTROL IN A VIRTUAL TAPE SYSTEM

[75] Inventor: Gregory Tad Kishi, Oro Valley, Ariz.

[73] Assignee: International Business Machines Corporation, Armonk, N.Y.

[21] Appl. No.: 08/989,503

[22] Filed: Dec. 12, 1997

[51] Int. Cl.[7] .................................................. G06F 17/00
[52] U.S. Cl. .......................... 707/201; 707/202; 707/203; 711/152
[58] Field of Search ................ 707/1–206; 711/100–111, 711/152; 709/101–205, 352; 238/492

[56] References Cited

U.S. PATENT DOCUMENTS

| | | |
|---|---|---|
| 5,257,377 | 10/1993 | Sathi et al. . |
| 5,313,631 | 5/1994 | Kao . |
| 5,410,703 | 4/1995 | Nilsson et al. ............................ 709/101 |
| 5,564,037 | 10/1996 | Lam ......................................... 707/204 |
| 5,717,856 | 2/1998 | Carleton et al. .......................... 709/205 |
| 5,778,395 | 7/1998 | Whiting et al. ............................. 707/10 |
| 5,809,511 | 9/1998 | Peake ........................................ 707/205 |
| 5,870,732 | 2/1999 | Fisher et al. .................................. 707/1 |
| 5,911,148 | 6/1999 | Anglin et al. ............................. 711/111 |
| 5,926,834 | 7/1999 | Carlson et al. ........................... 711/152 |
| 6,016,393 | 1/2000 | White et al. .............................. 709/315 |
| 6,036,101 | 3/2000 | Hass et al. ................................ 235/492 |

OTHER PUBLICATIONS

"ADSTAR Distributed Storage Manager (ADSM)—performance overview white paper", http://www.storage.ibm.com/storage/software/adsm/adwhperf.htm, pp. 1–9 (Jul. 15, 1997).

Grimaldi et al., Elefant and Kanguru: hardware control panels dedicated to disk servers for slow motion, editing and multiplay applications. Broadcasting Convention 1997, pp. 269–271, Sep. 1997.

Ohyo et al., Real–time reproduction of 3D human images in virtual sphere conferencing, Virtual Reality Annual International Symposium, pp. 408–414, Sep. 1993.

Stein et al., The recovery from task execution errors during the delayed teleoperation, IEEE/RSG/GI International Conference, pp. 547–554 vol. 1, Sep. 1994.

*Primary Examiner*—Thomas G. Black
*Assistant Examiner*—David Jung
*Attorney, Agent, or Firm*—Altera Law Group, LLC

[57] ABSTRACT

A method is disclosed for automatically reconciling the client and server databases and actively management the files stored in the cache. The method monitors free space on a DASD so that a VTS is allowed to fill the DASD with data during a reconcile process. Furthermore, an active cache filename management scheme is provided that improved VTS performance by obtaining information on premigrated files thereby eliminating usage of a premigration candidate list.

50 Claims, 6 Drawing Sheets

APPARATUS FOR PERFORMING AUTOMATED RECONCILE CONTROL IN A VIRTUAL TAPE SYSTEM

BACKGROUND OF THE INVENTION

1. Field of the Invention

This invention relates in general to data storage and processing, and more particularly to distributed storage servers.

2. Description of Related Art

The implementation of new technology in magnetic tape products has meant that the density of data written to tape has increased by orders of magnitude in the last ten or fifteen years. The ability to record high density tapes, e.g., ten gigabytes or more on one physical volume, has led to reducing costs in physical tape hardware as well as in handling and management resources.

However, over the past five years, tape data set stacking products, i.e., software solutions to increase tape utilization, have evolved in response to the customer requirement for more efficient ways to manage the information stored on tape. To achieve increased capacity enablement, a virtual tape server (VTS) has been proposed. In a VTS, the hardware is transparent to the host and the user. The VTS requires little external management except though the library management element of the tape library into which a VTS is integrated.

In a hierarchical storage systems, such as a VTS, intensively used and frequently accessed data is stored in fast but expensive memory. One example of a fast memory is a direct access storage device (DASD). In contrast, less frequently accessed data is stored in less expensive but slower memory. Examples of slower memory are tape drives and disk drive arrays. The goal of the hierarchy is to obtain moderately priced, high-capacity storage while maintaining high-speed access to the stored information.

In the VTS system, a host data interface, a DASD, and a number of tape devices are provided. When the host writes a logical volume, or a file, to the VTS, the data is stored as a resident file on the DASD. Although the DASD provides quick access to this data, it will eventually reach full capacity and a backup or secondary storage system will be needed. An IBM 3590 tape cartridge is one example of a tape device that could be used as a backup or secondary storage system.

When the DASD fills to a predetermined threshold, the logical volume data for a selected logical volume, typically the oldest, is removed from the DASD to free space for more logical volumes. The selected DASD file is then appended onto a tape cartridge, or a physical volume, with the original left on the DASD for possible cache hits. When a DASD file has been appended to a tape cartridge and the original remains on the DASD, the file is "premigrated".

When the host reads a logical volume from the VTS, a cache hit occurs if the logical volume currently resides on the DASD. If the logical volume is not on the DASD, the storage manager determines which of the physical tape volumes contains the logical volume. The corresponding physical volume is then mounted on one of the tape devices, and the data for the logical volume is transferred back to the DASD from the tape.

Tape servers may use an engine to move data between the DASD and tape drives in a virtual tape server (VTS) environment. For example, the IBM Virtual Tape Server (VTS) uses the IBM Adstar Distributed Storage Manager (ADSM) as its engine to move data between the DASD and IBM 3590 tape drives on the VTS. In such a system, the VTS uses the a storage manager client on the DASD, e.g., the ADSM Hierarchical Storage Manager (HSM) client, and a distributed storage manager server attached to the tape drives to provide this function.

However, from time to time the storage manager client and the distributed storage manager server must be reconciled to synchronize their databases and expire files on the server. While reconcile is occurring, the storage manager client's auto-migration process is prevented from migrating files and freeing space on the DASD. Under certain conditions, the VTS can fill the remaining space on the DASD in less time than the reconcile takes, leading to a full DASD and a failure of the VTS.

Further, to open, read, write, and close files on the DASD, the VTS uses file functions, such as AIX file functions. The storage manager client function intercepts these file functions, performns the necessary operations, and returns any error codes to the VTS. However, for various VTS processes, a more efficient method of getting information on premigrated files on the DASD is required.

It can be seen that there is a need for a method for automatically reconciling the client and server databases and actively management the files stored in the cache.

It can also be seen that there is a need for a method that monitors free space on a DASD so that a VTS is allowed to fill the DASD with data during a reconcile process.

It can also be seen that there is a need for an active cache filename management scheme that improved VTS performance by obtaining information on premigrated files thereby eliminating usage of a premigration candidate list.

SUMMARY OF THE INVENTION

To overcome the limitations in the prior art described above, and to overcome other limitations that will become apparent upon reading and understanding the present specification, the present invention discloses a method for automatically reconciling the client and server databases and actively management the files stored in the cache.

The present invention solves the above-described problems by providing a method that monitors free space on a DASD so that a VTS is allowed to fill the DASD with data during a reconcile process. Furthermore, an active cache filename management scheme is provided that improved VTS performance by obtaining information on premigrated files thereby eliminating usage of a premigration candidate list.

A method in accordance with the principles of the present invention includes the steps of automatically reconciling a client and server database for a file system using a distributed storage manager, migrating disk files using a supplemental stubbing function of an automatic storage manager administrator while the distributed storage manger reconciles the client and server databases of the file system and actively managing the files stored in a cache file list of the automatic storage manager administrator to obtain information on premigrated files.

Other embodiments of a method in accordance with the principles of the invention may include alternative or optional additional aspects. One such aspect of the present invention is that the steps of reconciling and migrating further comprise the steps of initiating reconcile of a server and client database of a file system using a distributed storage manager, determining whether a disk needs more free space using an automatic storage manager administrator, selecting a file for stubbing from a cache list using the automatic storage administrator, stubbing the file using the automatic storage manager administrator while the distributed storage manager is reconciling the server and client database for the file system.

An article of manufacture is provided in yet another aspect of the invention. The article of manufacture includes a computer readable medium having instructions for causing a computer to perform a method including the steps of automatically reconciling a client and server database for a file system using a distributed storage manager, migrating disk files using a supplemental stubbing function of an automatic storage manager administrator while the distributed storage manger reconciles the client and server databases of the file system, and actively managing the files stored in a cache file list of the automatic storage manager administrator to obtain information on premigrated files.

A virtual tape server is provided in yet another aspect of the invention. The virtual tape server includes primary storage media, secondary storage media forming an automated library, a library manager, a distributed storage manager for moving data between the primary and secondary storage media, the distributed storage manager further comprising a distributed storage manager server and a hierarchical storage manager client and an automatic storage manager administrator for controlling the distributed storage manager. The automatic storage manager administrator automatically commands the reconciliation of the client and server databases for a file system, migrates disk files using a supplemental stubbing function of the distributed storage manager while the distributed storage manger reconciles the client and server databases and actively manages the entries stored in a cache file list of the automatic storage manager administrator to obtain information on premigrated files.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method for automatically reconciling the client and server databases and actively management the files stored in the cache. According to the method, free space on a DASD is monitored so that a VTS is allowed to fill the DASD with data during a reconcile process. Furthermore, an active cache filename management scheme is provided that improved VTS performance by obtaining information on premigrated files thereby eliminating usage of a premigration candidate list.

Figure 1:
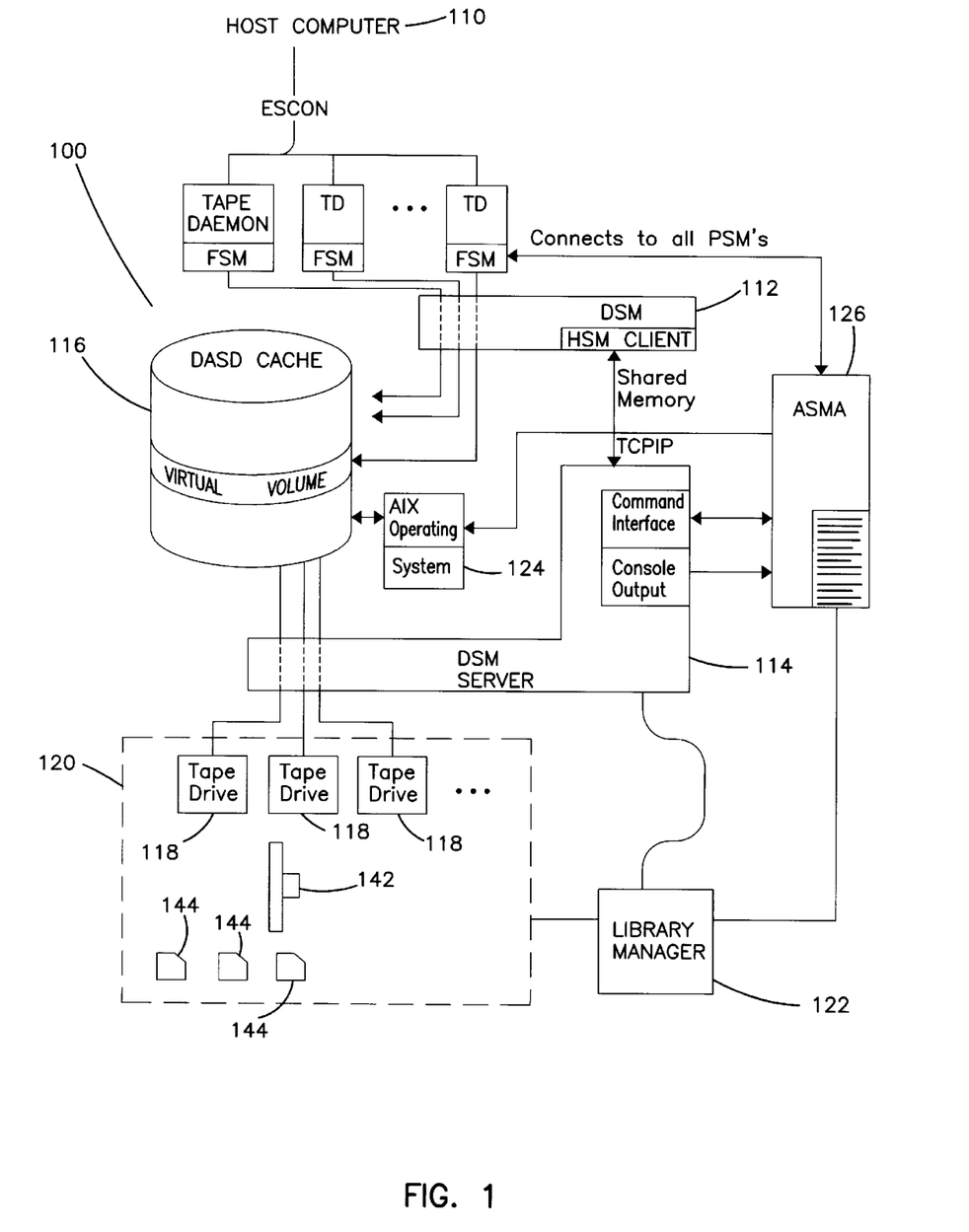
FIG. 1 illustrates a virtual tape server system according to the present invention.

FIG. 1 illustrates a virtual tape server system 100 according to the present invention. The virtual tape server attaches to a host computer 110, and includes a distributed storage manager client 112, an distributed storage manager server 114, DASD cache 116, a plurality of tape drives 118 forming an automated library 120, a library manager 122, an operating system 124 and an automatic storage manager administrator 126.

In the VTS 100, intensively used and frequently accessed data is stored in fast but expensive memory, such as direct access storage devices (DASD) 116. In contrast, less frequently accessed data is stored in less expensive but slower memory, such as tape drives 118.

A VTS 100 uses an engine 114 to move data between the DASD 116 and tape drives 118. For example, the IBM Virtual Tape Server (VTS) uses the IBM Adstar Distributed Storage Manager (ADSM) as its engine to move data between the DASD and IBM 3590 tape drives on the VTS. In such a system, the VTS 100 uses the a storage manager client 112, e.g., the ADSM Hierarchical Storage Manager (HSM) client, and a distributed storage manager server 114 attached to the tape drives 118 to provide this function. The library manager 122, via commands from the distributed storage manager server 1114, controls an accessor 142 which accesses individual tapes 144.

The distributed storage manager client 112 is a hierarchical storage manager that may be used for a broad range of applications. As such, the distributed storage manager client 112 often has a downlevel list of which files have a recent copy on one of the tapes 144 as a result of updating a premigrated file. This leads to picking the "wrong" file when trying to free disk space, slowing the process by requiring data to be copied to tape, rather than "stubbing" one already there. The distributed storage manager client 112 does not have a list of just the unstubbed files on disk, which forces all disk queries to scan the entire directory, e.g., 50,000 files. However, preferably only the unstubbed files need to be scanned, e.g., on the order of 300 files. The distributed storage manager client 112 requires a quiet period to reconcile with its server 114. However, the VTS 100 has no quiet periods. Further, the distributed storage manager client 112 masks and/or cannot accurately report disk/tape I/O errors.

To overcome these shortcomings, the automatic storage manager administrator 126 is provided to link all the VTS code components and external links, e.g., to the library manager 122 and the tapes drives 118.

Figure 2:
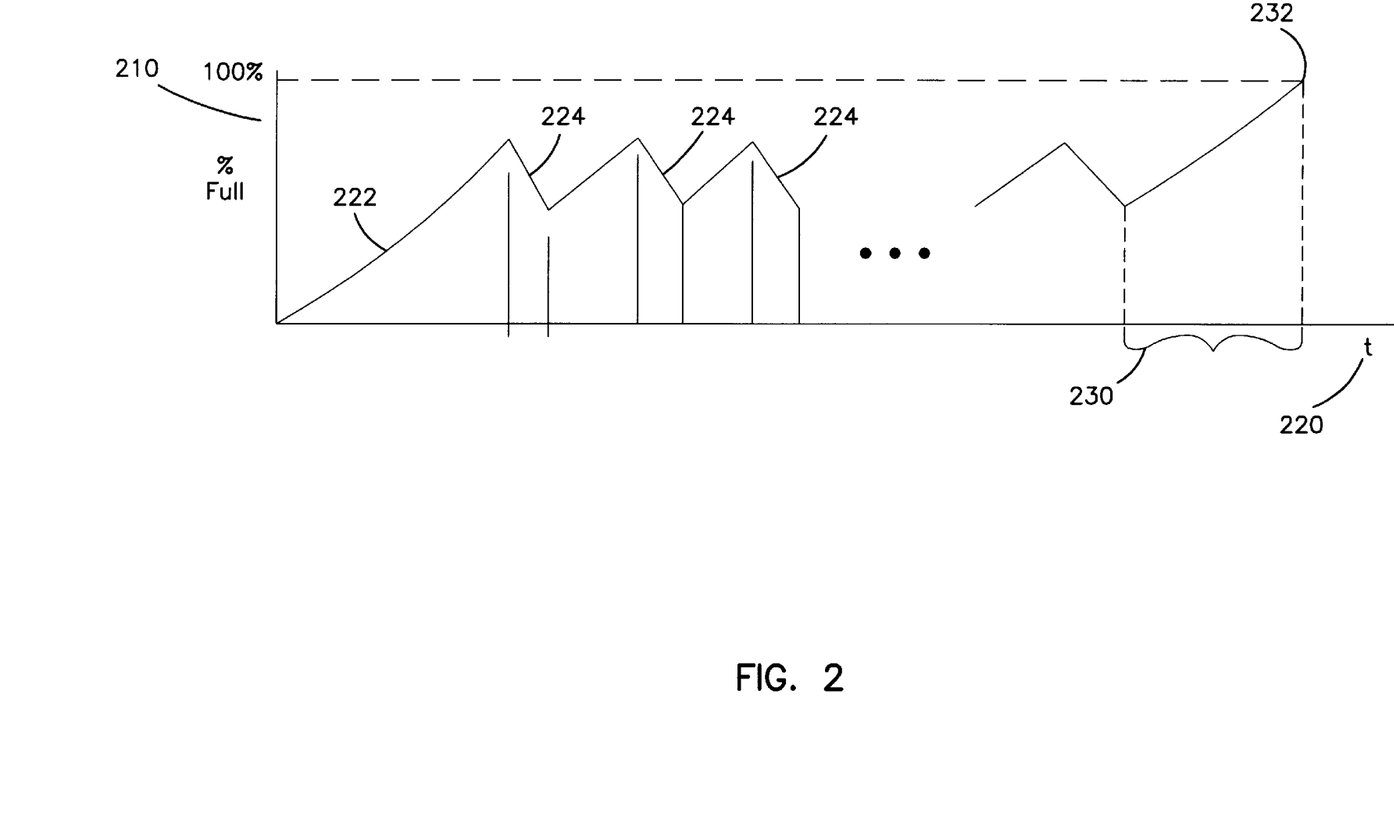
FIG. 2 illustrates a plot of DASD storage capacity over time.

In operation, the reconcile process, i.e., synchronizing the client 112 and server 114 databases on the VTS 100, can take longer to complete than it takes for the DASD 116 to become full. FIG. 2 illustrates a plot 200 of DASD storage capacity 210 over time 220. As more files are stored on the DASD, the used capacity percentage increases 222. Client storage space on the DASD is released 224 by coping a file from DASD to server storage, e.g., on the tape drives. On the DASD the original file is replaced with a stub file that points to the original file that is moved to the tape system. The stubbing truncates the file to just its header, typically 4 K, from its average size of 250 MB. This frees up space 224 on the VTS DASD for more new host data.

As shown in FIG. 2, the distributed storage manager stubs to free space 224. However, the distributed storage manager function becomes inactive during the reconcile process 230, which allows the disk to fill 232. Nevertheless, the automatic storage manager administrator provides supplemental disk stubbing functions that supports the stubbing function of the distributed storage manager whenever the distributed storage manager needs to have its process go off-line.

Figure 3:
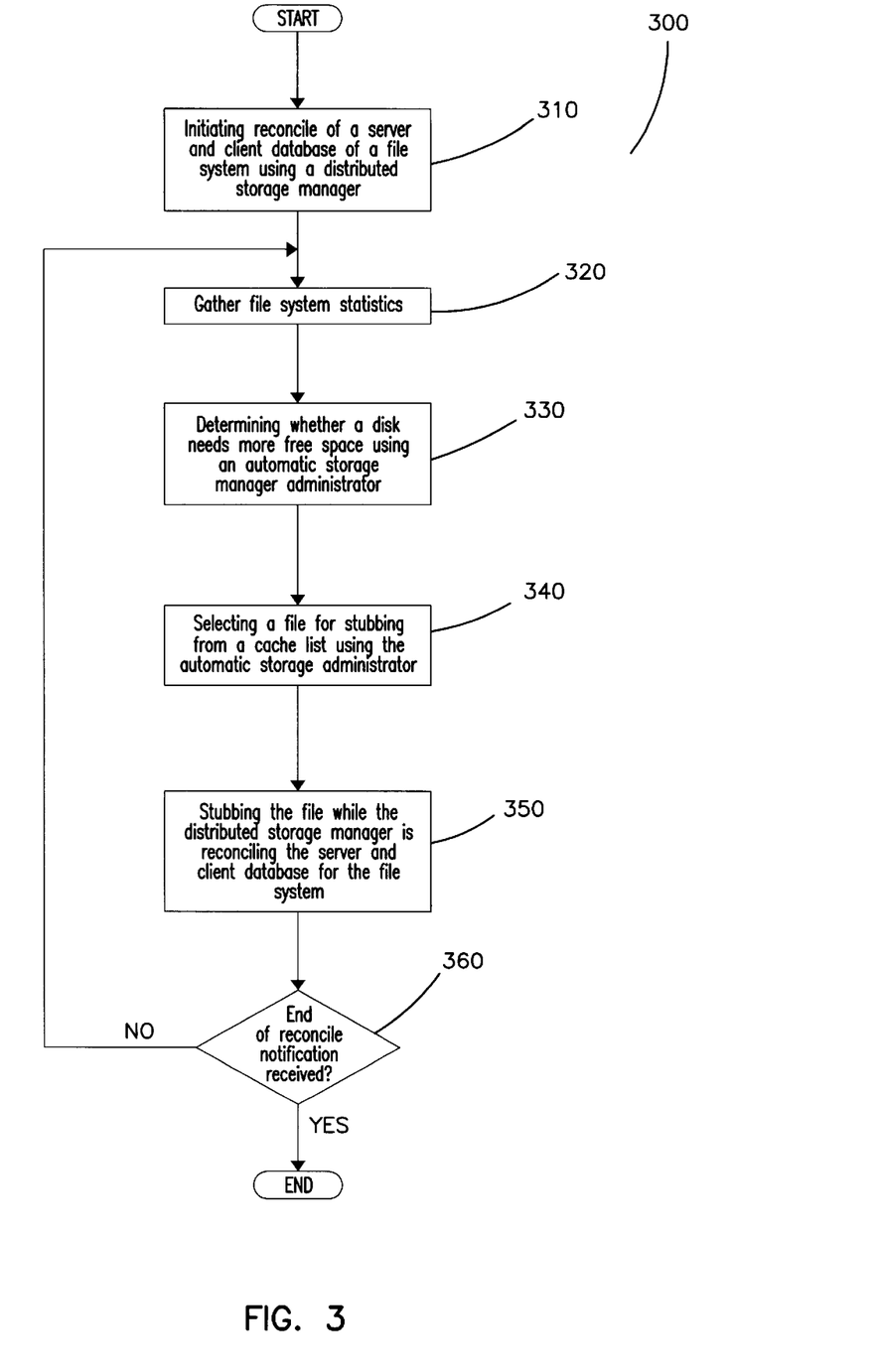
FIG. 3 illustrates a flow chart of a method of performing automated reconcile in a VTS.

FIG. 3 illustrates a flow chart 300 of a method of performing automated reconcile in a VTS. First, reconcile of a server and client database of a file system is initiated using a distributed storage manager 310.

The distributed storage manager may be set up by default to never reconcile automatically in a VTS. Instead, the automatic storage manager administrator may run a timer function to determine when the distributed storage manager server can reconcile, e.g., the timer may be set to twenty-four hours. If the timer has expired, the timer thread places a reconcile request to its reconcile thread and the timer is reset. In addition, if a substantial period of time has passed, e.g., eighteen hours, and if enough drives are idle for a long enough period to indicate the VTS is probably idle, the timer may be reset and a reconcile request may also be placed to the automatic storage manager administrator reconcile thread. For each of the managed file systems, the automatic storage manager administrator reconcile thread sends a "START" message to the automatic storage manager administrator reconcile disk management thread for the file system being reconciled. The automatic storage manager administrator issues the reconcile command to the distributed storage manager server for that file system and waits for it to complete. The automatic storage manager administrator then sends an "END" message to the automatic storage manager administrator reconcile disk management thread.

The automatic storage manager administrator reconcile disk management thread waits for a "START" message, then it periodically performs "statfs" on the file system 320 to gather statistics to determine how much free space is left 330. When the appropriate threshold is reached, the reconcile disk management thread commands the disk management thread to issue a migrate (stub) request for the oldest file on its cache file list 340. The distributed storage manager stubs the file and the automatic storage manager administrator waits for the stubbing to complete 350. The steps may be repeated until an "END" message is received 360. At that time, this thread goes back to waiting for a start message. Since the cache file list is ordered, the oldest premigrated file is stubbed first, and the freeing of space will be accomplished quickly. Using this method, the VTS can continue to actively fill the DASD with data during a reconcile. However, an active cache filename management scheme may be used to improve VTS performance by obtaining information on premigrated files thereby eliminating usage of a premigration candidate list.

Turning again to FIG. 1, the VTS opens, reads, writes, and closes files on its DASD using file functions, such as AIX file functions. The storage manager client function intercepts these file functions, performs the necessary operations, and returns any error codes to the VTS. The automatic storage manager administrator actively manages the cached file list and a VTS File System Manager (FSM) communicates with an automatic storage manager administrator to improving the efficiency of getting information on premigrated and resident files on the DASD.

Figure 4:
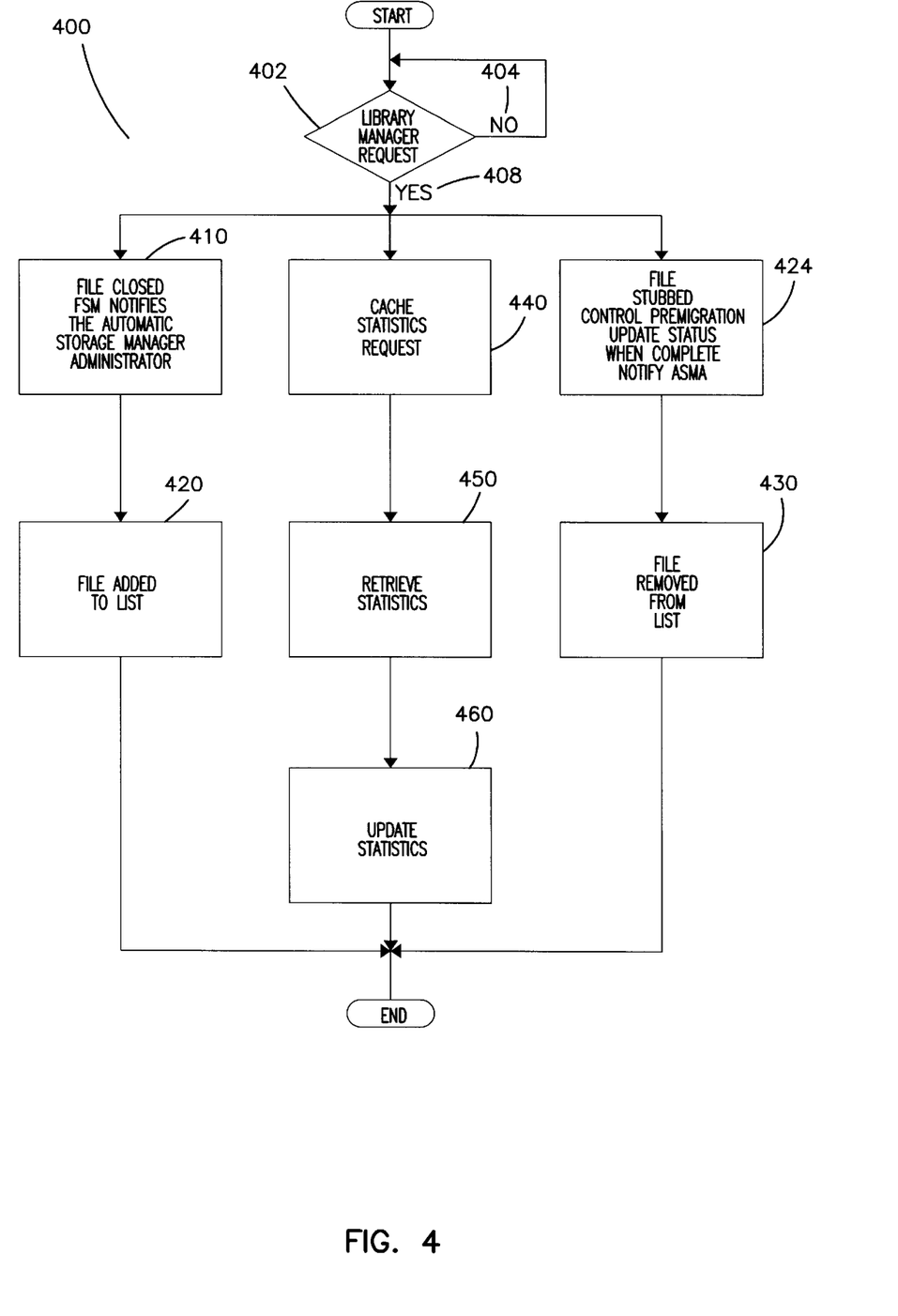
FIG. 4 illustrates a flow chart of the method for handling library manager requests.

FIG. 4 illustrates a flow chart 400 of the method for handling library manager requests. First, a determination is made as to whether a library manager request is made 402. If a library request has not been made 404, the method 400 waits for a request. Otherwise the request is handled 408. Whenever a file is closed by the VTS, a VTS File System Manager (FSM) function calls a automatic storage manager administrator supplied function to notify the automatic storage manager administrator of the file closing 410. This function queues an update message to the automatic storage manager administrator cached file management thread so that the file is added to the cached list as a resident file 420. This thread receives all these update messages, then appends each filename to the end of the cached file list (latest file) after first discarding any duplicate entries. If the file is stubbed, the automatic storage manager controls the premigration of files and updates the status of each file to premigrated when a files premigration is complete 424. The automatic storage manager administrator is notified of files being stubbed 424 and removes such files from the list 430.

Whenever automatic storage manager administrator is required to report cache statistics 440, e.g., on schedule or upon request by the library manager, the automatic storage manager administrator scans the files in the cached file list, gathers cache statistics and determines if the file is premigrated or local 450. The automatic storage manager administrator then updates the statistics as appropriate 460.

Figure 5:
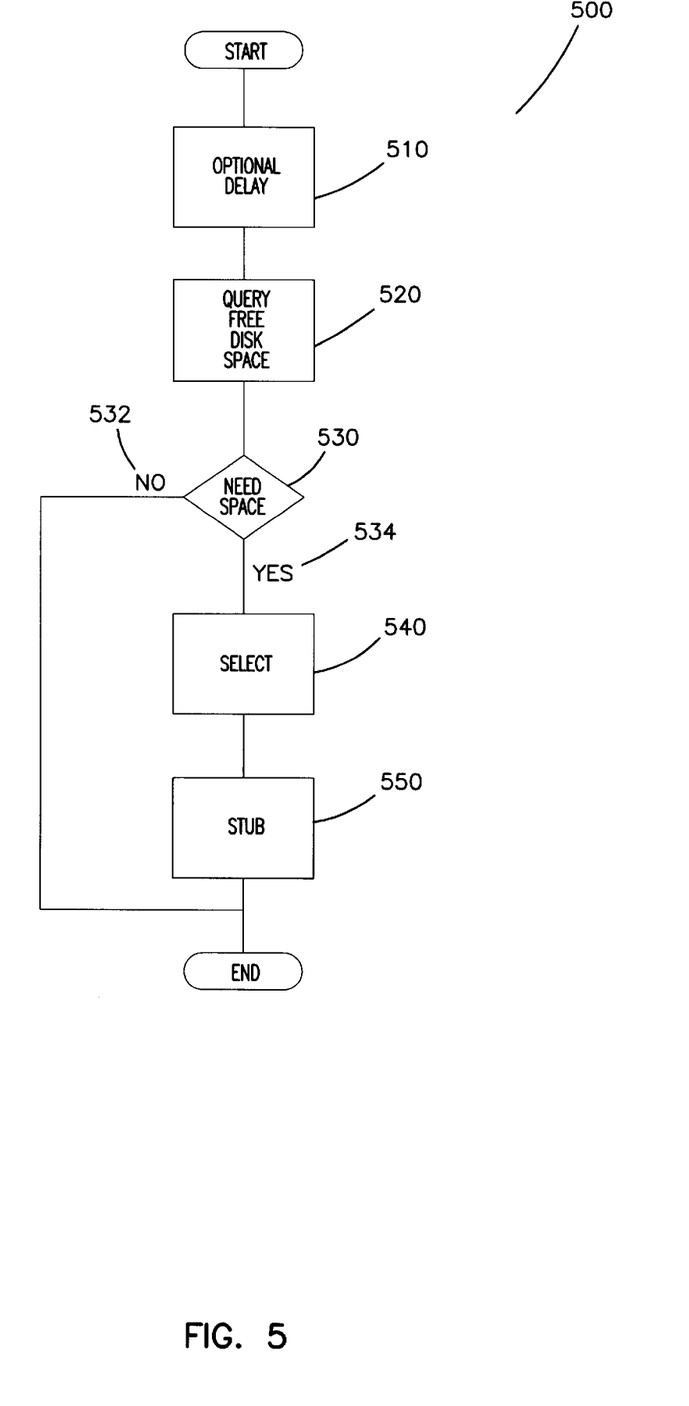
FIG. 5 illustrates a flow chart of the method for handling the freeing of disk space.

FIG. 5 illustrates a flow chart 500 of the method for handling the freeing of disk space. The freeing of disk space process may be delayed 510. Next, the automatic storage manager administrator queries for free disk space 520. Files that the cache statistics shows are migrated are removed from the cached file list at that time. Having a list of only those files that could possibly be premigrated speeds up the process (in a full system 150X+).

Next, a determination is made as to whether addition disk space is needed 530. If sufficient disk space exists 532, resident files will not be migrated. If additional disk space is required 534, a migrate request is issued 540. Since the list is ordered with the oldest file at the head of the list, it can be used to migrate files (stub premigrated files to get free space on the DASD) by issuing a migrate request for the first premigrated file on the list. The automatic storage manager administrator then removes the oldest file on the list hat is already copied on tape from the cached list 550. This avoids usage of the ADSM premigration candidates list for file migration, Accordingly, this method provides an advantage since the automatic storage manager administrator managed list is kept continually updated as files open and close on the VTS DASD.

Thus, a method is provided for automatically reconciling the client and server databases and actively management the files stored in the cache. The present invention solves the above-described problems by providing a method that monitors free space on a DASD so that a VTS is allowed to fill the DASD with data during a reconcile process. Furthermore, an active cache filename management scheme is provided that improved VTS performance by obtaining information on premigrated files thereby eliminating usage of a premigration candidate list.

Figure 6:
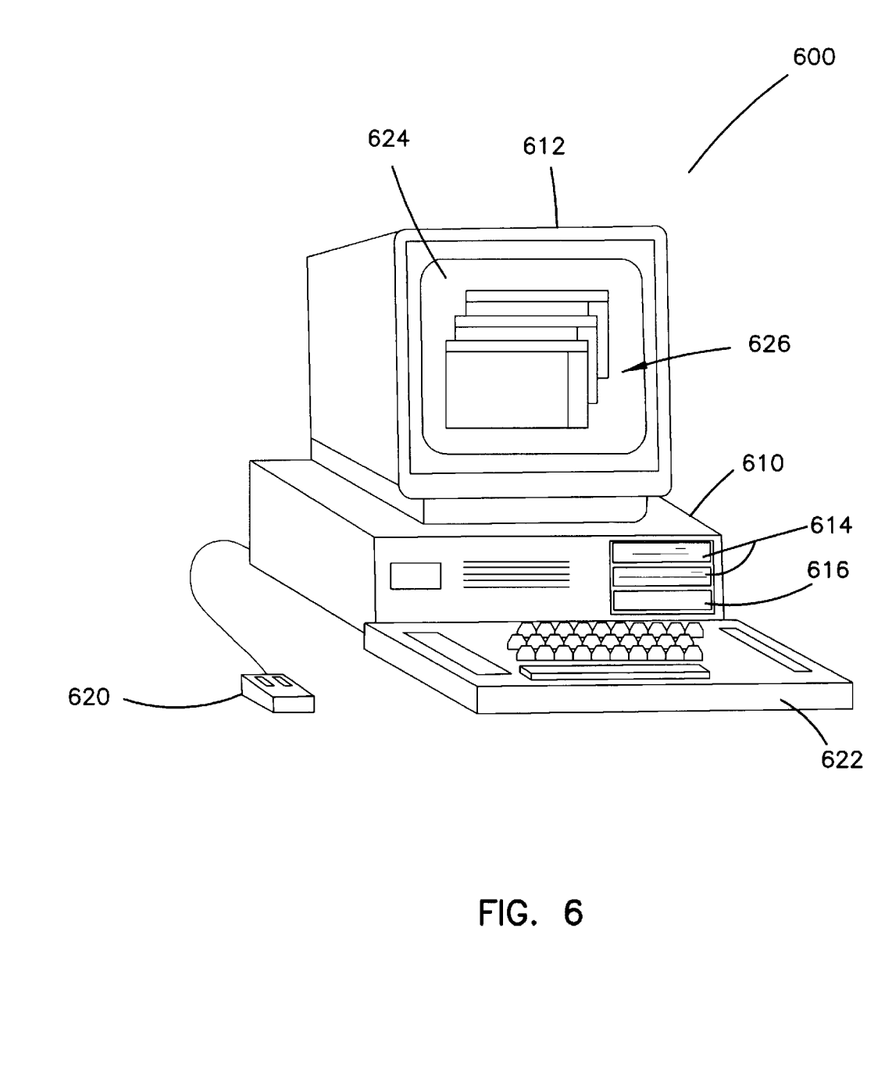
FIG. 6 is a block diagram illustrating an exemplary hardware environment for for performing automated reconcile control according to the present invention.

FIG. 6 is a block diagram 600 that illustrates an exemplary hardware environment for for performing automated reconcile control according to the present invention. The present invention is typically implemented using a computer 610 comprised of a microprocessor, random access memory (RAM), read-only memory (ROM), and other components. It is envisioned that attached to the computer 610 may be a monitor 612, floppy disk drives 614, and CD-ROM drives 616. Also included in the preferred embodiment may be input devices, for example, a mouse pointing device 620 and a keyboard 622.

The computer 610 operates under the control of an operating system 624, such as the Windows, OS/2, Macintosh, or UNIX operating systems, which is represented in FIG. 6 by the screen display on the monitor 612. The computer 610 executes one or more computer programs 626, which are represented in FIG. 6 by the "windows" displayed on the monitor 612, under the control of the operating system 624. The present invention comprises a storage manager that is preferably implemented in the operating system 624 and/or computer programs 626.

Generally, the operating system 624 and the computer programs 626 may be tangibly embodied in a computer-readable medium or carrier, e.g. one or more of the fixed and/or removable data storage devices 614 and 616, or other data storage or data communications devices. Both the operating system 624 and the computer programs 626 may be loaded from the data storage devices 614 and 616 into the random access memory of the computer 610 for execution by the microprocessor as discussed above with reference to FIG. 6. Both the operating system 624 and the computer programs 626 comprise instructions which, when read and executed by the microprocessor of the computer 610, causes the computer 610 to perform the steps necessary to execute the steps or elements of the present invention.

Although an exemplary computer system configuration is illustrated in FIG. 6, those skilled in the art will recognize that any number of different configurations performing similar functions may be used in accordance with the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for performing automated reconcile control in a virtual tape system, comprising the steps of:
   automatically reconciling a client and server database for a file system using a distributed storage manager;
   migrating disk files using a supplemental stubbing function of an automatic storage manager administrator while the distributed storage manger reconciles the client and server databases of the file system; and
   actively managing the files stored in a cache file list of the automatic storage manager administrator to obtain information on premigrated files.

2. The method of claim 1 wherein the steps of reconciling and migrating further comprise the steps of:
   initiating reconcile of a server and client database of a file system using a distributed storage manager;
   determining whether a disk needs more free space using an automatic storage manager administrator;
   selecting a file for stubbing from a cache list using the automatic storage administrator; and
   stubbing the file using the automatic storage manager administrator while the distributed storage manager is reconciling the server and client database for the file system.

3. The method of claim 2 further comprising the step of commanding the distributed storage manager with the automatic storage manager administrator to reconcile the server and client database.

4. The method of claim 3 wherein the step of commanding the distributed storage manager to reconcile the server and client database further comprises the step of issuing a reconcile command to the distributed storage manager.

5. The method of claim 2 further comprising the step of receiving an end of reconciling indication by the automatic storage manager administrator when reconcile is completed by the distributed storage manager.

6. The method of claim 2 wherein the steps of determining, selecting and stubbing are repeated by a reconcile disk management thread of the automatic storage manager administrator until reconcile of the service and client database is completed.

7. The method of claim 6 wherein the reconcile disk management thread of the automatic storage manager administrator determines whether a disk needs more free space by gathering statistics on the file system.

8. The method of claim 6 wherein the reconcile disk management thread of the automatic storage manager administrator selects a file for stubbing from a cache list by selecting an oldest file in the cache file list.

9. The method of claim 6 wherein the reconcile disk management thread of the automatic storage manager administrator repeats the determining, selecting and stubbing steps until an end of reconciling indication is received by the reconcile disk management thread.

10. The method of claim 1 wherein the step of actively managing the files stored in a cache file list of the automatic storage manager administrator further comprises the step of continually updating the cache file list according to a premigration status and maturity.

11. The method of claim 10 wherein the step of continually updating the cache file list further comprises the steps of:
    notifying the automatic storage manager administrator of a file closing;
    discarding by the automatic storage manager administrator of all duplicate entries in the cache file list; and
    adding by the automatic storage manager administrator the closed file to the cache file list.

12. The method of claim 11 further comprising the steps of:
    requesting cache file statistics from the automatic storage manager administrator;
    scanning the cache file list to determine if a file is premigrated or local;
    updating the cache file statistics; and
    removing all migrated files from the cache file list.

13. The method of claim 12 wherein the step of updating the cache file statistics further comprises the step of sorting the cache file by maturity so that the oldest file is first in the cache file list.

14. The method of claim 12 further comprising the steps of:
    migrating the first file on the list; and
    removing the first file after the first file has been migrated.

15. A method of performing automated reconcile of a server and client database in a virtual tape server, comprising the steps of:

- initiating reconcile of a server and client database of a file system using a distributed storage manager;
- determining whether a disk needs more free space using an automatic storage manager administrator;
- selecting a file for stubbing from a cache list using the automatic storage administrator;
- stubbing the file using the automatic storage manager administrator while the distributed storage manager is reconciling the server and client database for the file system.

16. The method of claim 15 further comprising the step of commanding the distributed storage manager with the automatic storage manager administrator to reconcile the server and client database.

17. The method of claim 16 wherein the step of commanding the distributed storage manager to reconcile the server and client database further comprises the step of issuing a reconcile command to the distributed storage manager.

18. The method of claim 15 further comprising the step of receiving an end of reconciling indication by the automatic storage manager administrator when reconcile is completed by the distributed storage manager.

19. The method of claim 15 wherein the steps of determining, selecting and stubbing are repeated by a reconcile disk management thread of the automatic storage manager administrator until reconcile of the service and client database is completed.

20. The method of claim 19 wherein the reconcile disk management thread of the automatic storage manager administrator determines whether a disk needs more free space by gathering statistics on the file system.

21. The method of claim 19 wherein the reconcile disk management thread of the automatic storage manager administrator selects a file for stubbing from a cache list by selecting an oldest file in the cache file list.

22. The method of claim 19 wherein the reconcile disk management thread of the automatic storage manager administrator repeats the determining, selecting and stubbing steps until an end of reconciling indication is received by the reconcile disk management thread.

23. An article of manufacture for a computer-based user-interface, the article of manufacture comprising a computer readable medium having instructions for causing a computer to perform a method comprising the steps of:

- automatically reconciling a client and server database for a file system using a distributed storage manager;
- migrating disk files using a supplemental stubbing function of an automatic storage manager administrator while the distributed storage manger reconciles the client and server databases of the file system; and
- actively managing the files stored in a cache file list of the automatic storage manager administrator to obtain information on premigrated files.

24. The article of claim 23 wherein the steps of reconciling and migrating further comprise the steps of:

- initiating reconcile of a server and client database of a file system using a distributed storage manager;
- determining whether a disk needs more free space using an automatic storage manager administrator;
- selecting a file for stubbing from a cache list using the automatic storage administrator; and
- stubbing the file using the automatic storage manager administrator while the distributed storage manager is reconciling the server and client database for the file system.

25. The article of claim 24 further comprising the step of commanding the distributed storage manager with the automatic storage manager administrator to reconcile the server and client database.

26. The article of claim 25 wherein the step of commanding the distributed storage manager to reconcile the server and client database further comprises the step of issuing a reconcile command to the distributed storage manager.

27. The article of claim 24 further comprising the step of receiving an end of reconciling indication by the automatic storage manager administrator when reconcile is completed by the distributed storage manager.

28. The article of claim 24 wherein the steps of determining, selecting and stubbing are repeated by a reconcile disk management thread of the automatic storage manager administrator until reconcile of the service and client database is completed.

29. The article of claim 28 wherein the reconcile disk management thread of the automatic storage manager administrator determines whether a disk needs more free space by gathering statistics on the file system.

30. The article of claim 28 wherein the reconcile disk management thread of the automatic storage manager administrator selects a file for stubbing from a cache list by selecting an oldest file in the cache file list.

31. The article of claim 28 wherein the reconcile disk management thread of the automatic storage manager administrator repeats the determining, selecting and stubbing steps until an end of reconciling indication is received by the reconcile disk management thread.

32. The article of claim 23 wherein the step of actively managing the files stored in a cache file list of the automatic storage manager administrator further comprises the step of continually updating the cache file list according to a premigration status and maturity.

33. The article of claim 32 wherein the step of continually updating the cache file list further comprises the steps of:

- notifying the automatic storage manager administrator of a file closing;
- discarding by the automatic storage manager administrator of all duplicate entries in the cache file list; and
- adding by the automatic storage manager administrator the closed file to the cache file list.

34. The article of claim 33 further comprising the steps of:

- requesting cache file statistics from the automatic storage manager administrator;
- scanning the cache file list to determine if a file is premigrated or local;
- updating the cache file statistics; and
- removing all migrated files from the cache file list.

35. The article of claim 34 wherein the step of updating the cache file statistics further comprises the step of sorting the cache file by maturity so that the oldest file is first in the cache file list.

36. The article of claim 34 further comprising the steps of:

- migrating the first file on the list; and
- removing the first file after the first file has been migrated.

37. An article of manufacture for a computer-based user-interface, the article of manufacture comprising a computer readable medium having instructions for causing a computer to perform automated reconcile of a server and client database in a virtual tape server, the method comprising the steps of:

initiating reconcile of a server and client database of a file system using a distributed storage manager;

determining whether a disk needs more free space using an automatic storage manager administrator;

selecting a file for stubbing from a cache list using the automatic storage administrator; and stubbing the file using the automatic storage manager administrator while the distributed storage manager is reconciling the server and client database for the file system.

38. The article of claim 37 further comprising the step of commanding the distributed storage manager with the automatic storage manager administrator to reconcile the server and client database.

39. The article of claim 38 wherein the step of commanding the distributed storage manager to reconcile the server and client database further comprises the step of issuing a reconcile command to the distributed storage manager.

40. The article of claim 37 further comprising the step of receiving an end of reconciling indication by the automatic storage manager administrator when reconcile is completed by the distributed storage manager.

41. The article of claim 37 wherein the steps of determining, selecting and stubbing are repeated by a reconcile disk management thread of the automatic storage manager administrator until reconcile of the service and client database is completed.

42. The article of claim 41 wherein the reconcile disk management thread of the automatic storage manager administrator determines whether a disk needs more free space by gathering statistics on the file system.

43. The article of claim 41 wherein the reconcile disk management thread of the automatic storage manager administrator selects a file for stubbing from a cache list by selecting an oldest file in the cache file list.

44. The article of claim 41 wherein the reconcile disk management thread of the automatic storage manager administrator repeats the determining, selecting and stubbing steps until an end of reconciling indication is received by the reconcile disk management thread.

45. A virtual tape server, comprising:

primary storage media for storing intensively used and frequently accessed data;

secondary storage media, coupled to the primary storage media, for storing less frequently accessed data and forming an automated library;

a library manager, coupled to the secondary storage media, for controlling access to the data stored on the secondary storage media;

a distributed storage manager, operatively coupled to the primary and secondary storage media, for moving data between the primary and secondary storage media, the distributed storage manager further comprising a distributed storage manager server and a hierarchical storage manager client; and an automatic storage manager administrator, coupled to the distributed storage manager, for controlling the distributed storage manager, the automatic storage manager administrator automatically commanding the reconciliation of client and server databases for a file system, migrating disk files using a supplemental stubbing function of the storage manager while the distributed storage manger reconciles the client and server databases and actively managing entries stored in a cache file list of the automatic storage manager administrator to obtain information on premigrated files.

46. The virtual tape server of claim 45 wherein the automatic storage manager administrator further comprises:

means for initiating reconcile of a server and client database of a file system using a distributed storage manager;

means for determining whether a disk needs more free space using an automatic storage manager administrator;

means for selecting a file for stubbing from a cache list using the automatic storage administrator; and means for stubbing the file using the automatic storage manager administrator while the distributed storage manager is reconciling the server and client database for the file system.

47. The virtual tape server of claim 45 wherein the automatic storage manager administrator further comprises means for continually updating the cache file list according to a premigration status and maturity.

48. The virtual tape server of claim 47 wherein the means for continually updating the cache file list further comprises:

means for notifying the automatic storage manager administrator of a file closing;

means for discarding by the automatic storage manager administrator of all duplicate entries in the cache file list; and means for adding by the automatic storage manager administrator the closed file to the cache file list.

49. The virtual tape server of claim 45 wherein the automatic storage manager administrator further comprises:

means for requesting cache file statistics from the automatic storage manager administrator;

means for scanning the cache file list to determine if a file is premigrated or local;

means for updating the cache file statistics; and means for removing all migrated files from the cache file list.

50. The virtual tape server of claim 45 wherein the automatic storage manager administrator further comprises:

means for migrating the first file on the list; and means for removing the first file after the first file has been migrated.

* * * * *

UNITED STATES PATENT AND TRADEMARK OFFICE
CERTIFICATE OF CORRECTION

PATENT NO. : 6,105,037
DATED : August 15, 2000
INVENTOR(S) : Gregory Tad Kishi

It is certified that error appears in the above-identified patent and that said Letters Patent is hereby corrected as shown below:

<u>Column 2,</u>
Line 19, delete the word "performns" and add the word -- performs --.

<u>Column 3,</u>
Line 61, delete the "for" after the word "environment".

<u>Column 5,</u>
Line 34, start a new paragraph after the word "thread";
Line 56, start a new paragraph after the word "message".

<u>Column 6,</u>
Line 22, start a new paragraph after the word "entries".

<u>Column 7,</u>
Line 2, delete the word "for" after "the environment".

Signed and Sealed this

Twenty-fourth Day of September, 2002

*Attest:*

*Attesting Officer*

JAMES E. ROGAN
*Director of the United States Patent and Trademark Office*